US009002798B1

(12) United States Patent
Raj et al.

(10) Patent No.: US 9,002,798 B1
(45) Date of Patent: Apr. 7, 2015

(54) SYSTEMS AND METHODS FOR REMEDYING CORRUPT BACKUP IMAGES OF HOST DEVICES

(71) Applicant: Symantec Corporation, Mountain View, CA (US)

(72) Inventors: Ritansh Raj, Bihar (IN); Vikas Verma, Kanpur (IN); Manohar Muluk, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 140 days.

(21) Appl. No.: 13/764,239

(22) Filed: Feb. 11, 2013

(51) Int. Cl.
*G06F 17/00* (2006.01)
*G06F 17/30* (2006.01)

(52) U.S. Cl.
CPC .................. *G06F 17/30303* (2013.01)

(58) Field of Classification Search
CPC ............... G06F 17/30073; G06F 17/30088
USPC .......................................................... 707/654
See application file for complete search history.

(56) References Cited

U.S. PATENT DOCUMENTS

| | | | | |
|---|---|---|---|---|
| 5,822,517 | A * | 10/1998 | Dotan | 726/22 |
| 6,067,410 | A * | 5/2000 | Nachenberg | 703/28 |
| 6,205,527 | B1 * | 3/2001 | Goshey et al. | 711/162 |
| 6,460,054 | B1 * | 10/2002 | Grummon | 1/1 |
| 6,594,686 | B1 * | 7/2003 | Edwards et al. | 709/203 |
| 6,611,850 | B1 * | 8/2003 | Shen | 1/1 |
| 6,910,111 | B1 * | 6/2005 | Colgrove et al. | 711/162 |
| 6,912,629 | B1 * | 6/2005 | West et al. | 711/161 |
| 6,912,631 | B1 * | 6/2005 | Kekre et al. | 711/162 |
| 6,978,354 | B1 * | 12/2005 | Kekre et al. | 711/162 |
| 7,246,275 | B2 * | 7/2007 | Therrien et al. | 714/710 |
| 7,266,572 | B2 * | 9/2007 | Vishlitzky et al. | 711/118 |
| 7,293,146 | B1 * | 11/2007 | Kekre et al. | 711/162 |
| 7,440,982 | B2 * | 10/2008 | Lu et al. | 1/1 |
| 7,487,383 | B2 * | 2/2009 | Bensinger | 714/4.11 |
| 7,565,574 | B2 * | 7/2009 | Fujibayashi | 714/6.32 |
| 8,176,358 | B2 * | 5/2012 | Bensinger | 714/4.1 |
| 8,407,795 | B2 * | 3/2013 | Palagummi | 726/24 |
| 2002/0069363 | A1 * | 6/2002 | Winburn | 713/200 |
| 2005/0165853 | A1 * | 7/2005 | Turpin et al. | 707/200 |
| 2006/0224636 | A1 * | 10/2006 | Kathuria et al. | 707/200 |
| 2009/0106578 | A1 * | 4/2009 | Dilman et al. | 714/2 |
| 2009/0106603 | A1 * | 4/2009 | Dilman et al. | 714/42 |
| 2012/0297246 | A1 * | 11/2012 | Liu et al. | 714/15 |

OTHER PUBLICATIONS

Simmons, Ken, et al., "Chapter 10: Managing Backups", Pro SQL Server 2012 Administration, Apress, Berkeley, CA, © 2012, pp. 257-281.*

(Continued)

*Primary Examiner* — Robert Stevens
(74) *Attorney, Agent, or Firm* — ALG Intellectual Property, LLC

(57) ABSTRACT

A computer-implemented method for remedying corrupt backup images of host devices may include (1) identifying a backup image that represents a computing state of a host device at a specific point in time, (2) performing a data-corruption analysis on the backup image that represents the computing state of the host device to determine whether the backup image is corrupt, (3) determining that at least a portion of the backup image is corrupt based at least in part on the data-corruption analysis, and then (4) performing at least one remedial action to initiate remedying the corrupt portion of the backup image in response to determining that the portion of the backup image is corrupt. Various other methods, systems, and computer-readable media are also disclosed.

20 Claims, 7 Drawing Sheets

(56) References Cited

OTHER PUBLICATIONS

Dewson, Robin, "Chapter 7: Database Backups, Recovery, and Maintenance", Beginning SQL Server 2008 for Developers: From Novice to Professional, Apress, Berkeley, CA, © 2008, pp. 181-247.*

Cox, Landon P., et al., "Pastiche: Making Backup Cheap and Easy", OSDI '02, vol. 36, Issue SI, Winter 2002, pp. 285-298.*

Nelson, Steven, "Chapter 1: Introduction to Backup and Recovery", Pro Data Backup and Recovery, Apress, Berkeley, CA, © 2011, pp. 1-16.*

\* cited by examiner

SYSTEMS AND METHODS FOR REMEDYING CORRUPT BACKUP IMAGES OF HOST DEVICES

BACKGROUND

In today's world of vast computing technology, many technology users are concerned with protecting the integrity and reliability of data stored on their computing devices. In an effort to address such concerns, some users may configure their computing devices to utilize backup and restore technologies capable of facilitating restoration of data that has become corrupt or unusable. For example, a user may configure his or her laptop computer to back up various onboard data to a remote backup service. In this example, by configuring the laptop computer to back up the onboard data to the remote backup service, the user may decrease his or her risk of losing the data altogether in the event that the data onboard the laptop computer becomes corrupt or unusable.

However, while conventional backup and restore technologies may facilitate restoration of data that has become corrupt or unusable, such backup and restore technologies may also suffer from one or more shortcomings and/or vulnerabilities. For example, the remote backup service may experience a system failure that ultimately leads to the corruption of at least a portion of the data backed up by the user's laptop computer. Unfortunately, the remote backup service may be unable to initiate any type of remedial action that immediately remedies the corrupt portion of backup data. As a result, the user may still be at risk of losing this portion of data altogether in the event that the data onboard the laptop computer becomes corrupt or unusable.

What is needed, therefore, are systems and methods for remedying corrupt backup data in order to eliminate (or at least decrease) the risk of data loss.

SUMMARY

As will be described in greater detail below, the instant disclosure generally relates to systems and methods for remedying corrupt backup images of host devices in order to eliminate (or at least decrease) the risk of data loss.

In one example, a computer-implemented method for remedying corrupt backup images of host devices may include (1) identifying a backup image that represents a computing state of a host device at a specific point in time, (2) performing a data-corruption analysis on the backup image that represents the computing state of the host device to determine whether the backup image is corrupt, (3) determining that at least a portion of the backup image is corrupt based at least in part on the data-corruption analysis, and then (4) performing at least one remedial action to initiate remedying the corrupt portion of the backup image in response to determining that the portion of the backup image is corrupt.

In some examples, the method may also include identifying an administrative device associated with an administrator responsible for maintaining the backup image. In such examples, the method may further include providing the administrative device with an alert configured to notify the administrator of the corrupt portion of the backup image.

In one example, the method may also include identifying a duplicate instance of the backup image that is not corrupt. For example, the method may include using a relational-mapping mechanism to identify the non-corrupt duplicate instance of the backup image based at least in part on the backup image. In this example, the method may further include automatically replacing the backup image with the non-corrupt duplicate instance of the backup image such that the non-corrupt duplicate instance of the backup image is used to restore the host device to the computing state during a restore operation.

In some examples, the method may also include initiating a backup operation on the host device to capture a replacement backup image that represents the computing state of the host device at a current point in time. In such examples, the method may further include automatically replacing the backup image with the replacement backup image such that the replacement backup image is used to restore the host device to the computing state during a restore operation.

In some examples, the method may also include identifying a plurality of files included in the backup image during the data-corruption analysis. In such examples, the method may further include determining that a file included in the plurality of files is corrupt based at least in part on the data-corruption analysis. In addition, the method may include initiating a backup operation on the host device to capture a non-corrupt instance of the file from the host device and then incorporating the non-corrupt instance of the file into the backup image by automatically replacing the corrupt file included within the plurality of files with the non-corrupt instance of the file.

In one example, the method may include initiating the backup operation to capture a non-corrupt instance of the file at a current point in time. In another example, the method may include identifying a backup mechanism configured to periodically update the backup image based at least in part on at least one change to the computing state of the host device. In this example, the method may further include directing the backup mechanism to capture a non-corrupt instance of the file during a future update to the backup image such that the backup mechanism captures the non-corrupt instance of the file and the change to the computing state of the host device without capturing an additional instance of each of the plurality of files included in the backup image during the future update.

In addition, the method may include incorporating the non-corrupt instance of the file into the backup image by automatically replacing the corrupt file included within the plurality of files with the non-corrupt instance of the file after the backup mechanism has captured the non-corrupt instance of the file. For example, the method may include reconfiguring the backup image to reference the non-corrupt instance of the file instead of the corrupt file.

In some examples, the method may also include performing the data-corruption analysis on the backup image on a periodic basis. Additionally or alternatively, the method may include detecting an event that suggests that at least a portion of the backup image is corrupt and then initiating the data-corruption analysis in response to detecting the event that suggests that the portion of the backup image is corrupt.

In one embodiment, a system for implementing the above-described method may include (1) an identification module programmed to identify a backup image that represents a computing state of a host device at a specific point in time, (2) an analysis module programmed to perform a data-corruption analysis on the backup image that represents the computing state of the host device to determine whether the backup image is corrupt, (3) a determination module programmed to determine that at least a portion of the backup image is corrupt based at least in part on the data-corruption analysis, and (4) a remediation module programmed to perform at least one remedial action to initiate remedying the corrupt portion of the backup image in response to the determination that the portion of the backup image is corrupt. The system may also include at least one processor configured to execute the identification module, the analysis module, the determination module, and the remediation module.

In some examples, the above-described method may be encoded as computer-readable instructions on a non-transitory computer-readable-storage medium. For example, a non-transitory computer-readable-storage medium may include one or more computer-executable instructions that, when executed by at least one processor of a computing device, may cause the computing device to (1) identify a backup image that represents a computing state of a host device at a specific point in time, (2) perform a data-corruption analysis on the backup image that represents the computing state of the host device to determine whether the backup image is corrupt, (3) determine that at least a portion of the backup image is corrupt based at least in part on the data-corruption analysis, and then (4) perform at least one remedial action to initiate remedying the corrupt portion of the backup image in response to the determination that the portion of the backup image is corrupt.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
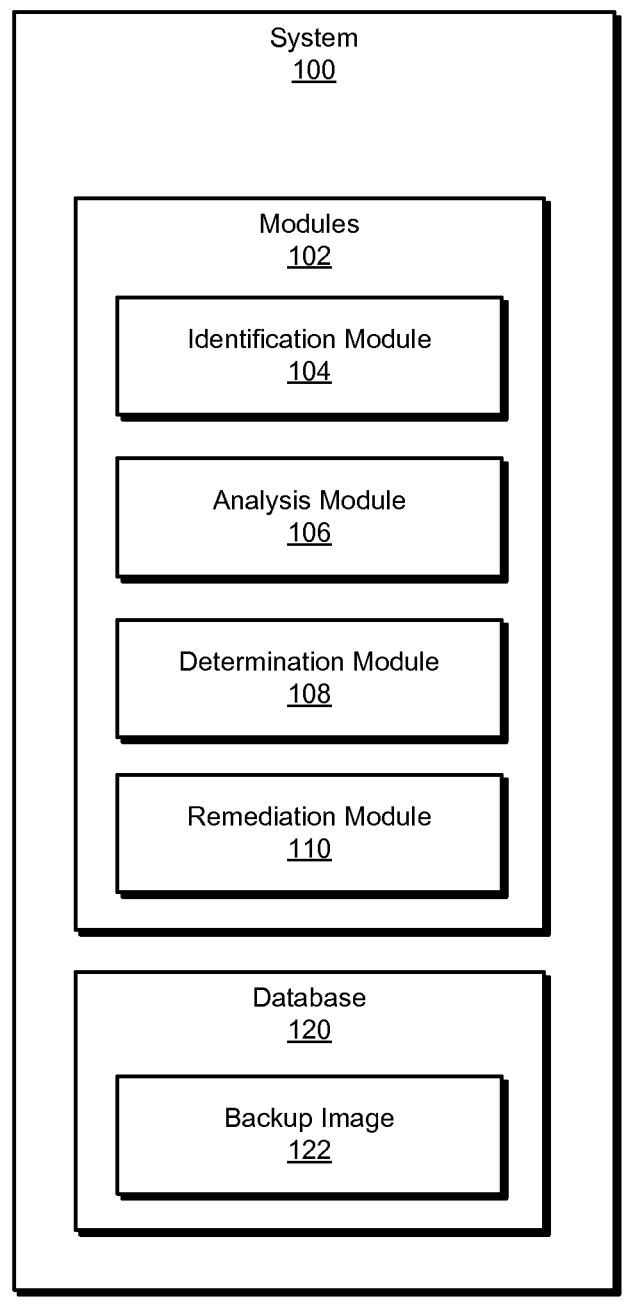
FIG. 1 is a block diagram of an exemplary system for remedying corrupt backup images of host devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for remedying corrupt backup images of host devices. As will be explained in greater detail below, by performing a data-corruption analysis on a backup image, the various systems and methods described herein may determine that at least a portion of the backup image is corrupt and then automatically initiate remedying the corrupt portion of the backup image in response to this determination. By remedying the corrupt portion of the backup image in response to this determination, the various systems and methods described herein may ensure that a remedied instance of the backup image is available in the event that a user attempts to restore his or her device to an earlier computing state represented by the backup image.

Figure 2:
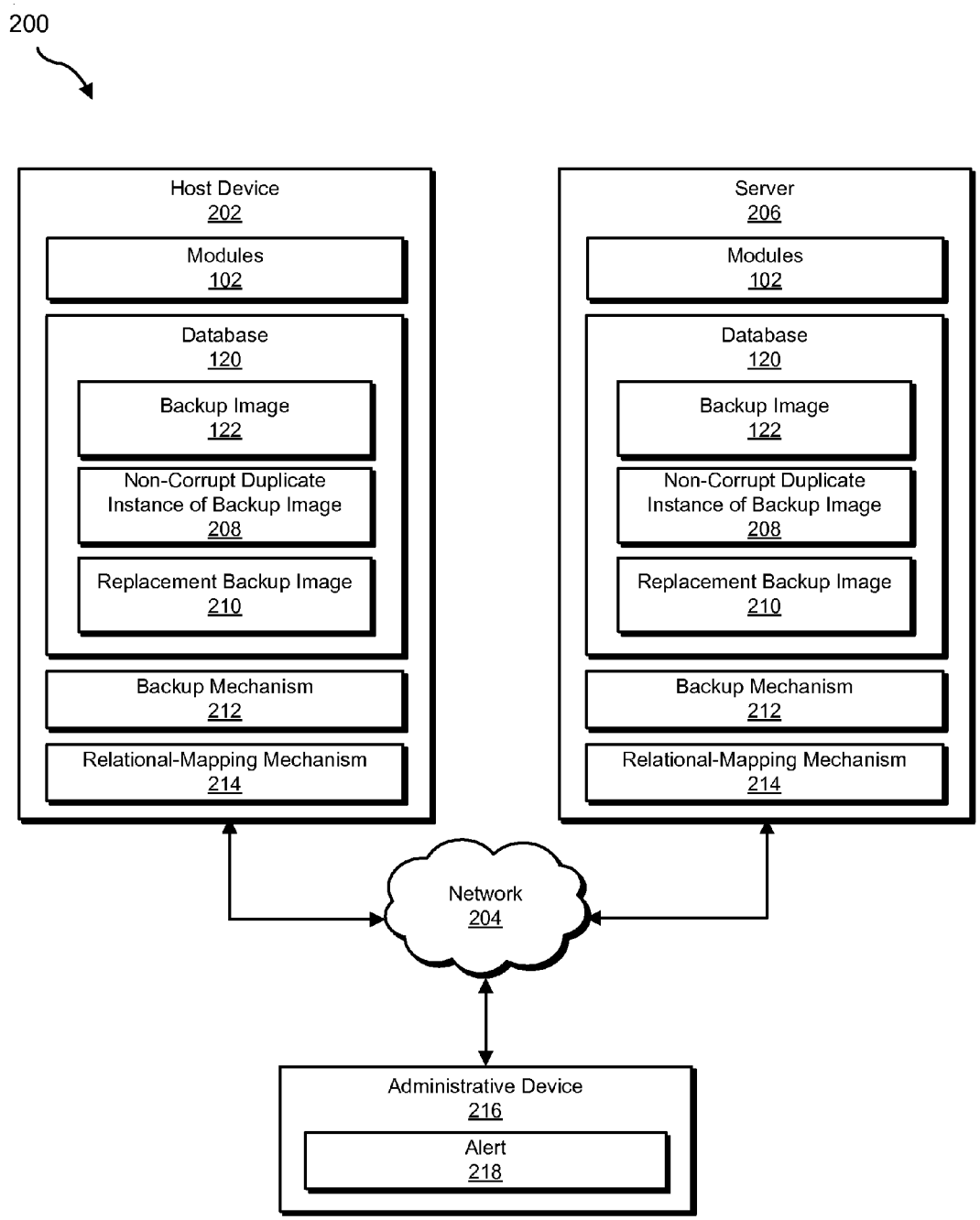
FIG. 2 is a block diagram of an exemplary system for remedying corrupt backup images of host devices.

The following will provide, with reference to FIGS. 1-2, detailed descriptions of exemplary systems for remedying corrupt backup images of host devices. Detailed descriptions of corresponding computer-implemented methods will be provided in connection with FIG. 3. Detailed descriptions of an exemplary backup image, an exemplary duplicate instance of the backup image, and an exemplary update to the backup image will be provided in connection with FIG. 4, and detailed descriptions of an exemplary alert that identifies a corrupt backup image will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for remedying corrupt backup images of host devices. As illustrated in this figure, exemplary system 100 may include one or more modules 102 for performing one or more tasks. For example, and as will be explained in greater detail below, exemplary system 100 may include an identification module 104 programmed to identify a backup image that represents a computing state of a host device at a specific point in time. Exemplary system 100 may also include an analysis module 106 programmed to perform a data-corruption analysis on the backup image that represents the computing state of the host device to determine whether the backup image is corrupt.

In addition, and as will be described in greater detail below, exemplary system 100 may include a determination module 108 programmed to determine that at least a portion of the backup image is corrupt based at least in part on the data-corruption analysis. Exemplary system 100 may further include a remediation module 110 programmed to perform at least one remedial action to initiate remedying the corrupt portion of the backup image in response to the determination that the portion of the backup image is corrupt. Although illustrated as separate elements, one or more of modules 102 in FIG. 1 may represent portions of a single module or application (such as SYMANTEC'S VERITAS FILE SYSTEM or SYMANTEC'S CLUSTER FILE SYSTEM).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., host device 202, server 206, and/or administrative device 216), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store at least one backup image that represents the computing state of at least one host device at a specific point in time. For example, database 120 may store a backup image 122 that includes an instance of each file located on a host device at a specific point in time. Database 120 may also store various other data not illustrated in FIG. 1 (e.g., non-corrupt duplicate instance of backup image 208 and replacement backup image 210 in FIG. 2, corrupt duplicate instance of backup image 400 and update to backup image 402 in FIG. 4, and/or various other backup images not illustrated in FIG. 2 or 4).

The phrase "backup image," as used herein, generally refers to any type or form of file that includes a complete or partial copy of the contents and/or data located on a particular computing or storage device (e.g., host device 202 in FIG. 2). In addition, the phrase "computing state," as used herein, generally refers to any state or condition of the contents and/or data located on a particular computing or storage device (e.g., host device 202 in FIG. 2) at a specific point in time.

Database 120 may represent portions of a single database or computing device or a plurality of databases or computing devices. For example, database 120 may represent portions of host device 202 and/or server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as host device 202, server 206, and/or administrative device 216 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a host device 202, a server 206, and an administrative device 216 in communication with one another via a network 204. Host device 202 may be programmed with one or more of modules 102 and/or may store all or a portion of the data in database 120. Additionally or alternatively, server 206 may be programmed with one or more of modules 102 and/or may store all or a portion of the data in database 120.

As shown in FIG. 2, host device 202 and/or server 206 may include one or more of modules 102, database 120, a backup mechanism 212, and/or a relational-mapping mechanism 214. The phrase "backup mechanism," as used herein, generally refers to any type or form of software application capable of capturing and/or updating a backup image that represents the computing state of a host device (e.g., host device 202) at a specific point in time when executed by a computing device (e.g., host device 202 or server 206). In addition, the phrase "relational-mapping mechanism," as used herein, generally refers to any type or form of software application and/or database that maps a backup image (e.g., backup image 122) to a duplicate instance of the backup image (e.g., non-corrupt duplicate instance of backup image 208 in FIG. 2 and/or corrupt duplicate instance of backup image 400 in FIG. 4) and facilitates identifying the duplicate instance of the backup image based at least in part on the backup image when executed and/or accessed by a computing device (e.g., host device 202 or server 206).

In one example, database 120 may include backup image 122, a duplicate instance of backup image 208, and/or a replacement backup image 210. In this example, backup image 122 may represent the computing state of host device 202 at a specific point in time (e.g., in the past). In addition, replacement backup image 210 may represent the computing state of host device 202 at a current point in time (e.g., at the present time).

In one example, non-corrupt duplicate instance of backup image 208 may represent the same computing state of host device 202 as backup image 122. However, unlike backup image 122, non-corrupt duplicate instance of backup image 208 may not have experienced any type or form of data corruption.

As shown in FIG. 2, administrative device 216 may include an alert 218 provided by one or more of modules 102. In one example, administrative device 216 may present alert 218 to an administrator responsible for maintaining backup image 122. In this example, alert 218 may be configured to notify the administrator of a corrupt portion of backup image 122. Examples of alert 218 include, without limitation, display alerts, audio alerts, haptic-based alerts, tactile-based alerts, combinations of one or more of the same, or any other suitable alert.

In one embodiment, one or more of modules 102 from FIG. 1 may, when executed by at least one processor of host device 202 and/or server 206, facilitate host device 202 and/or server 206 in remedying corrupt backup images. For example, and as will be described in greater detail below, one or more of modules 102 may cause host device 202 and/or server 206 to (1) identify backup image 122 that represents the computing state of host device 202 at a specific point in time, (2) perform a data-corruption analysis on backup image 122 to determine whether backup image 122 is corrupt, (3) determine that at least a portion of backup image 122 is corrupt based at least in part on the data-corruption analysis, and then (4) perform at least one remedial action to initiate remedying the corrupt portion of backup image 122 in response to determining that the portion of backup image 122 is corrupt.

Host device 202 generally represents any type or form of computing device capable of reading computer-executable instructions. Examples of host device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable host device.

Server 206 generally represents any type or form of computing device capable of maintaining and/or remedying backup images of host devices. Examples of server 206 include, without limitation, application servers, web servers, storage servers, and/or database servers configured to run certain software applications and/or provide various web, storage, and/or database services.

Administrative device 216 generally represents any type or form of computing device capable of reading computer-executable instructions. Examples of administrative device 216 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable administrative device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication among host device 202, server 206, and administrative device 216.

Figure 3:
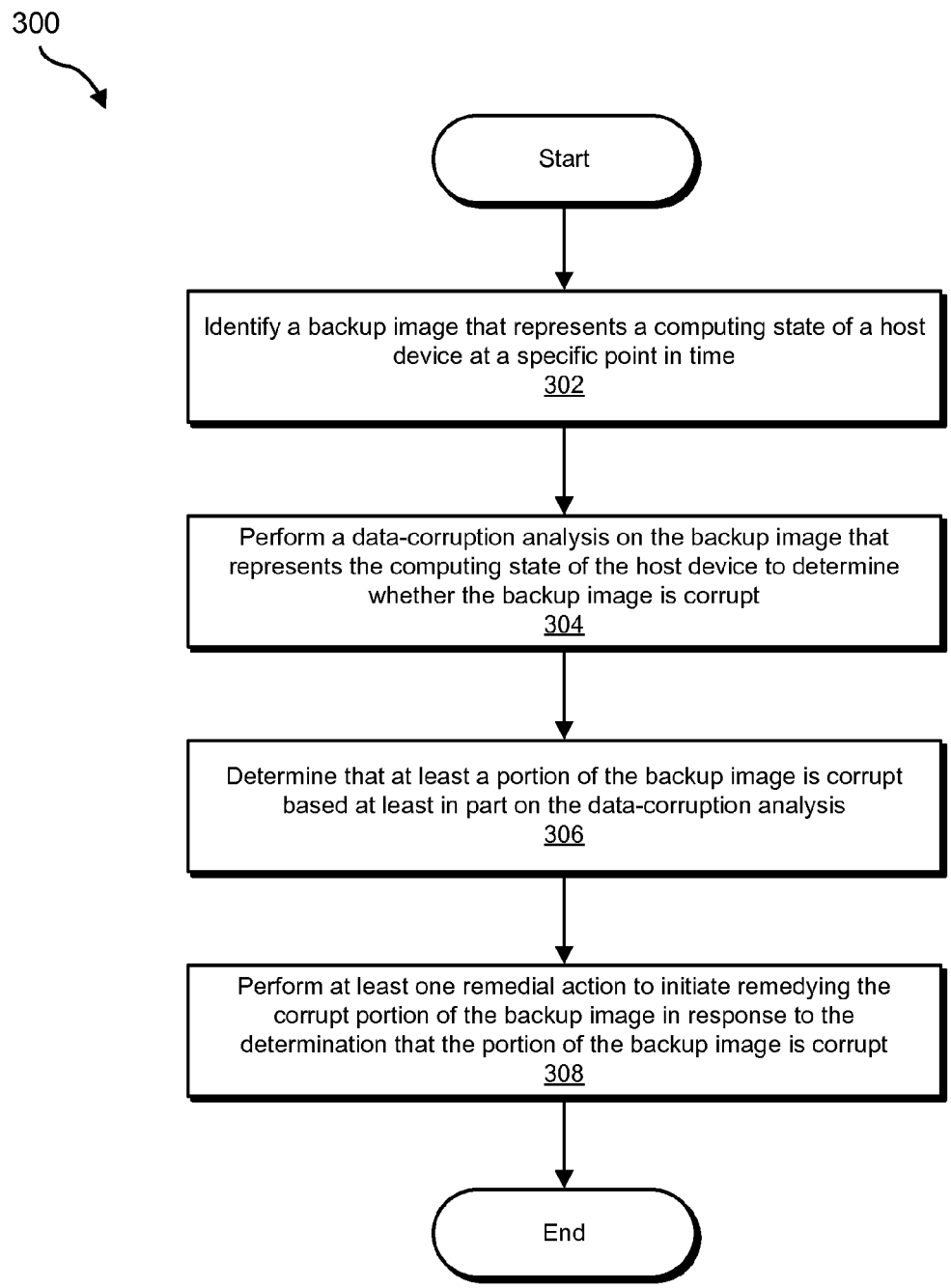
FIG. 3 is a flow diagram of an exemplary method for remedying corrupt backup images of host devices.

FIG. 3 is a flow diagram of an exemplary computer-implemented method 300 for remedying corrupt backup images of host devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a backup image that represents a computing state of a host device at a specific point in time. For example, at step 302 identification module 104 may, as part of host device 202 and/or server 206 in FIG. 2, identify backup image 122 that represents the computing state of host device 202 at a previous point in time. In one example, backup image 122 may include an instance of each file located on host device 202 at the previous point in time. In another example, backup image 122 may include an instance of each file within a subset of files located on host device 202 at the previous point in time.

The systems described herein may perform step 302 in a variety of ways. In some examples, identification module 104 may identify backup image 122 after backup mechanism 212 has captured backup image 122. For example, backup mechanism 212 may perform a backup operation on host device 202 to capture backup image 122 at approximately 12 noon Coordinated Universal Time (UTC) on 20 Feb. 2013. In this example, backup image 122 may represent the computing state of host device 202 at approximately 12 noon UTC on 20 Feb. 2013. Upon capturing backup image 122, backup mechanism 212 may store backup image 122 in database 120 to facilitate restoring host device 202 to the computing state represented by backup image 122 at a later point in time.

In one example, backup mechanism 212 may, as part of host device 202 in FIG. 2, capture backup image 122 and then store the same locally in database 120 on host device 202. For example, upon capturing backup image 122, backup mechanism 212 may direct host device 202 to store backup image 122 locally in database 120. In this example, identification module 104 may then, as part of host device 202 in FIG. 2, identify backup image 122 in database 120 on host device 202.

In another example, backup mechanism 212 may, as part of host device 202 in FIG. 2, capture backup image 122 and then upload the same to database 120 on server 206. For example, upon capturing backup image 122, backup mechanism 212 may direct host device 202 to send backup image 122 to server 206 via network 204. In this example, server 206 may receive backup image 122 from host device 202 via network 204 and store backup image 122 in database 120. Identification module 104 may then, as part of server 206 in FIG. 2, identify backup image 122 in database 120 on server 206.

In one example, identification module 104 may identify backup image 122 while backup mechanism 212 is performing the backup operation on host device 202 to capture backup image 122. In another example, identification module 104 may identify backup image 122 as backup mechanism 212 is storing or uploading backup image 122 to database 120. In a further example, identification module 104 may identify backup image 122 in database 120 after backup mechanism 212 has stored or uploaded backup image 122 to database 120.

Figure 4:
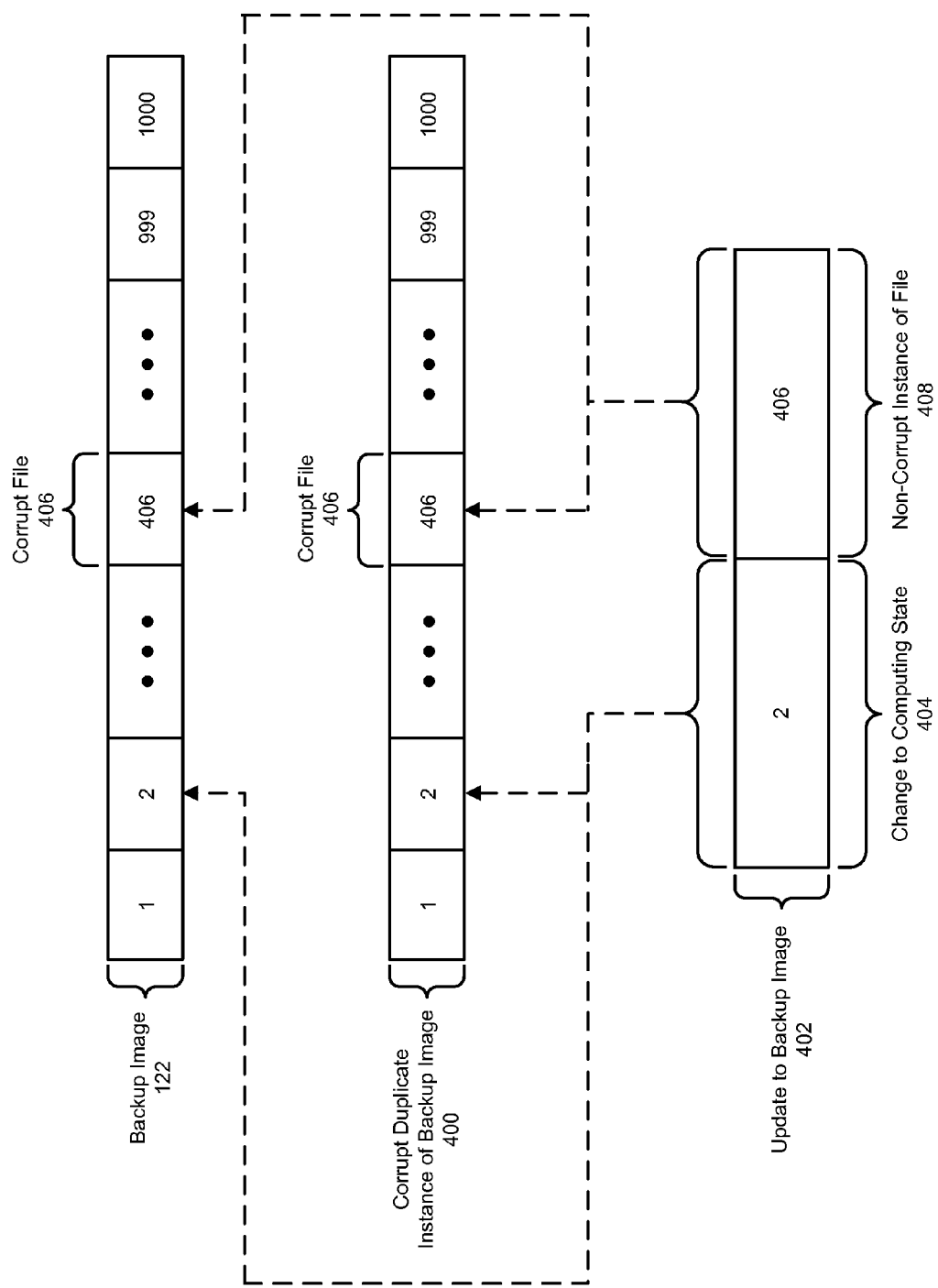
FIG. 4 is an illustration of an exemplary backup image, an exemplary duplicate instance of the backup image, and an exemplary update to the backup image.

In one example, backup image 122 may include an instance of each file located on host device 202. As illustrated in FIG. 4, backup image 122 may include a collection of 1000 files (in this example, "|1|2| . . . |406| . . . |999|1000|"). The original collection of 1000 files included in backup image 122 in FIG. 4 may represent an identical copy of the contents of host device 202 at approximately 12 noon UTC on 20 Feb. 2013.

As illustrated in FIG. 3, at step 304 one or more of the systems described herein may perform a data-corruption analysis on the backup image that represents the computing state of the host device to determine whether the backup image is corrupt. For example, at step 304 analysis module 106 may, as part of host device 202 and/or server 206 in FIG. 2, perform a data-corruption analysis on backup image 122 to determine whether the same is corrupt. The terms "corrupt" and "corruption," as used herein, generally refer to any type or form of unintentional and/or undesirable discrepancy between the computing state of a host device as currently represented by a backup image and the computing state of the host device at the specific point in time that the backup image was captured by a backup mechanism.

The systems described herein may perform step 304 in a variety of ways. In some examples, analysis module 106 may be configured to perform the data-corruption analysis on backup image 122 on a periodic basis. For example, analysis module 106 may be configured to perform a data-corruption analysis on backup image 122 at noon UTC each day to determine whether backup image 122 has become corrupt since the previous day.

In other examples, analysis module 106 may detect an event that suggests that at least a portion of backup image 122 is corrupt. For example, a user may direct host device 202 to restore host device 202 to the computing state captured at approximately 12 noon UTC on 20 Feb. 2013 by attempting to reconfigure the current computing state based at least in part on backup image 122. In this example, while attempting to reconfigure the current computing state based at least in part on backup image 122, host device 202 may encounter an error indicative or suggestive of data corruption within backup image 122.

In one example, analysis module 106 may, as part of host device 202, detect the error encountered by host device 202 while attempting to reconfigure the current computing state based at least in part on backup image 122. For example, analysis module 106 may monitor all data-restoration activity occurring on host device 202. In this example, while monitoring such data-restoration activity, analysis module 106 may detect the error encountered by host device 202 and then initiate the data-corruption analysis in response to detecting the error.

In another example, analysis module 106 may, as part of server 206, detect the error encountered by host device 202 while attempting to reconfigure the current computing state based at least in part on backup image 122. For example, host device 202 may encounter the error and then send a notification that identifies the error to server 206 via network 204. In this example, server 206 may receive the notification from host device 202 via network 204. As server 206 receives the notification from host device 202, analysis module 106 may, as part of server 206, determine the error identified in the notification and then initiate the data-corruption analysis in response to determining the error.

In some examples, analysis module 106 may perform the data-corruption analysis on backup image 122 by comparing a current verification identifier that represents backup image 122 with a reference verification identifier known to accurately represent the computing state of host device 202 at the specific point in time that backup image 122 was captured by backup mechanism 212. Examples of such verification identifiers include, without limitation, hashes, fingerprints, checksums, Message Digest 5 (MD5) checksums, secure hash algorithms, digital signatures, and/or any other suitable identifiers.

In one example, analysis module 106 may, as part of host device 202 or server 206, generate a reference verification identifier that represents at least a portion of the computing state of host device 202 at the specific point in time that backup image 122 was captured by backup mechanism 212. For example, analysis module 106 may generate a checksum from at least a portion of backup image 122 shortly after backup mechanism 212 captures backup image 122 at approximately 12 noon UTC on 20 Feb. 2013. In this example, analysis module 106 may then store the checksum generated from the portion of backup image 122 as a reference known to accurately represent the portion of the computing state of host device 202 at approximately 12 noon UTC on 20 Feb. 2013.

In addition, analysis module 106 may generate a current verification identifier that represents the same portion of the computing state captured in backup image 122 at the commencement of data-corruption analysis. For example, analysis module 106 may generate a checksum from the same portion of backup image 122 at approximately 12 noon UTC on 1 Mar. 2013. In this example, analysis module 106 may compare the checksum generated on 1 Mar. 2013 with the checksum generated on 20 Feb. 2013 to check for any discrepancy between the checksums. Analysis module 106 may then generate a result of this comparison to facilitate determining whether the portion of backup image 122 has become corrupt since backup mechanism 212 captured backup image 122 on 20 Feb. 2013.

As illustrated in FIG. 3, at step 306 one or more of the systems described herein may determine that at least a portion of the backup image is corrupt based at least in part on the data-corruption analysis. For example, at step 306 determination module 108 may, as part of host device 202 and/or server 206 in FIG. 2, determine that at least a portion of backup image 122 is corrupt based at least in part on the data-corruption analysis. In one example, the corrupt portion of backup image 122 may include only a subset of backup image 122. In another example, the corrupt portion of backup image 122 may include all of backup image 122.

The systems described herein may perform step 306 in a variety of ways. In one example, determination module 108 may determine that the portion of backup image 122 is corrupt based at least in part on the comparison of the current verification identifier that represents backup image 122 and the reference verification identifier known to accurately represent the computing state of host device 202 at the specific point in time that backup image 122 was captured by backup mechanism 212. For example, determination module 108 may identify the result of the comparison between the checksum generated on 1 Mar. 2013 and the checksum generated on 20 Feb. 2013. Determination module 108 may then determine that the portion of backup image 122 is corrupt based at least in part on the result of the comparison between these checksums.

In one example, determination module 108 may identify the specific portion of backup image 122 that is corrupt. For example, determination module 108 may analyze the result of the comparison between the checksum generated on 1 Mar. 2013 and the checksum generated on 20 Feb. 2013. In this example, determination module 108 may then determine that data corruption occurred within file 406 of backup image 122 in FIG. 4 based at least in part on analyzing the result of the comparison.

In another example, determination module 108 may determine that at least a portion of backup image 122 is corrupt without necessarily identifying which portion of backup image 122 is corrupt. For example, determination module 108 may analyze the result of the comparison between the checksum generated on 1 Mar. 2013 and the checksum generated on 20 Feb. 2013. In this example, the result of the comparison may fail to explicitly identify any particular file included within backup image 122 that is corrupt. As a result, while determination module 108 may determine that backup image 122 is corrupt based at least in part on analyzing the result of the comparison, determination module 108 may be unable to identify which file(s) included in backup image 122 are corrupt.

As illustrated in FIG. 3, at step 308 one or more of the systems described herein may perform at least one remedial action to initiate remedying the corrupt portion of the backup image in response to the determination that the portion of the backup image is corrupt. For example, at step 308 remediation module 110 may, as part of host device 202 and/or server 206 in FIG. 2, perform at least one remedial action to initiate remedying the corrupt portion of backup image 122 in response to the determination that the portion of backup image 122 is corrupt.

As will be described in greater detail below, examples of such remedial action include, without limitation, automatically providing administrative device 216 with alert 218 indicating that the portion of backup image 122 is corrupt, automatically replacing backup image 122 with non-corrupt duplicate instance of backup image 208, automatically initiating a backup operation on host device 202 to capture replacement backup image 210 representing the computing state of host device 202 at a current point in time, and/or automatically replacing the corrupt portion of backup image 122 with a non-corrupt instance.

The systems described herein may perform step 308 in a variety of ways. In one example, remediation module 110 may identify administrative device 216 associated with an administrator responsible for maintaining backup image 122 on server 206. In this example, remediation module 110 may provide administrative device 216 with alert 218 configured to notify the administrator of the corrupt portion of the backup image.

Figure 5:
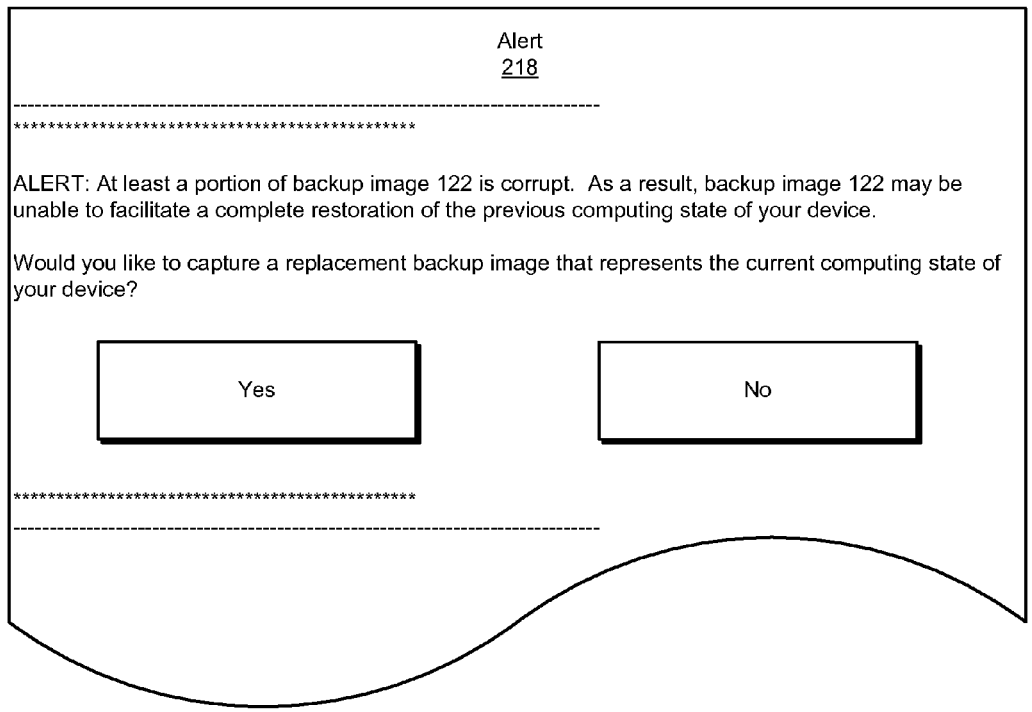
FIG. 5 is an illustration of an exemplary alert that identifies a corrupt backup image.

As illustrated in FIG. 5, alert 218 may include information indicating that backup image 122 is corrupt (in this example, "At least a portion of backup image 122 is corrupt. As a result, backup image 122 may be unable to facilitate a complete restoration of the previous computing state of your device."), a prompt requesting user input on whether to capture a replacement backup image from the administrator (in this example, "Would you like to capture a replacement backup image that represents the current computing state of your device?"), and software buttons configured to enable the administrator to initiate or decline capturing the replacement backup image (in this example, "Yes" and "No").

In one example, remediation module 110 may identify a duplicate instance of backup image 122 that is not corrupt. For example, backup mechanism 212 may have generated non-corrupt duplicate instance of backup image 208 from backup image 122 before file 406 included in backup image 122 in FIG. 4 became corrupt. In this example, non-corrupt duplicate instance of backup image 208 may accurately represent the computing state of host device 202 at approximately 12 noon UTC on 20 Feb. 2013 since non-corrupt duplicate instance of backup image 208 did not inherit corrupt file 406 from backup image 122.

In one example, backup mechanism 212 may store a record indicating that non-corrupt duplicate instance of backup image 208 was generated from backup image 122 in relational-mapping mechanism 214. In this example, by storing this record in relational-mapping mechanism 214, backup mechanism 212 may enable remediation module 110 to use the record stored in relational-mapping mechanism 214 to determine that non-corrupt duplicate instance of backup image 208 was generated from backup image 122.

In one example, remediation module 110 may access the record stored in relational-mapping mechanism 214 in response to the determination that backup image 122 is corrupt. In this example, remediation module 110 may determine that that non-corrupt duplicate instance of backup image 208 was generated from backup image 122 based at least in part on the record stored in relational-mapping mechanism 214. Upon determining that non-corrupt duplicate instance of backup image 208 was generated from backup image 122, remediation module 110 may automatically replace backup image 122 with non-corrupt duplicate instance of backup image 208 such that non-corrupt duplicate instance of backup image 208 becomes the primary backup image. In other words, remediation module 110 may ensure that non-corrupt duplicate instance of backup image 208 is used to restore host device 202 to the computing state captured at approximately 12 noon UTC on 20 Feb. 2013 in the event that the user of host device 202 requests such a restore operation.

In one example, remediation module 110 may initiate a backup operation on host device 202 to capture replacement backup image 210 representing the computing state of host device 202 in response to the determination that backup image 122 is corrupt. For example, remediation module 110 may capture replacement backup image 210 representing the computing state of host device 202 at approximately 12 noon UTC on 1 Mar. 2013. In this example, remediation module 110 may automatically replace backup image 122 with replacement backup image 210 such that replacement backup image 210 becomes the primary backup image. In other words, remediation module 110 may ensure that replacement backup image 210 is used to restore host device 202 to the computing state captured at approximately 12 noon UTC on 1 Mar. 2013 in the event that the user of host device 202 requests such a restore operation.

In one example, remediation module 110 may initiate a backup operation on host device 202 to capture a non-corrupt instance of file 406 from host device 202 in response to the determination that file 406 included in backup image 122 in FIG. 4 is corrupt. For example, remediation module 110 may initiate the backup operation to capture non-corrupt instance of file 408 in FIG. 4 (which represents file 406 as located on host device 202) at approximately 12 noon UTC on 1 Mar. 2013. In this example, remediation module 110 may incorporate non-corrupt instance of file 408 into backup image 122 by automatically replacing corrupt file 406 included in backup image 122 with non-corrupt instance of file 408. In other words, remediation module 110 may reconfigure backup image 122 to reference non-corrupt instance of file 408 instead of corrupt file 406.

In another example, remediation module 110 may direct backup mechanism 212 to capture non-corrupt instance of file 408 during a future update to backup image 122 in response to the determination that file 406 included in backup image 122 in FIG. 4 is corrupt. For example, remediation module 110 may direct backup mechanism 212 to capture non-corrupt instance of file 408 in FIG. 4 (which represents file 406 as located on host device 202) during update to backup image 402 in FIG. 4 scheduled for approximately 12 noon UTC on 6 Mar. 2013. In this example, backup mechanism 212 may then perform update to backup image 402 on schedule at approximately 12 noon UTC on 6 Mar. 2013.

As illustrated in FIG. 4, update to backup image 402 may involve capturing non-corrupt instance of file 408 and change to computing state 404. In one example, change to computing state 404 may represent at least one change to file 2 as located on host device 202 since backup mechanism 212 captured backup image 122 on 20 Feb. 2013. In another example, change to computing state 404 may represent at least one change to file 2 as located on host device 202 since backup mechanism 212 last updated backup image 122.

In addition, update to backup image 402 may involve incorporating non-corrupt instance of file 408 and change to computing state 404 into backup image 122. For example, backup mechanism 212 may automatically replace corrupt file 406 included in backup image 122 with non-corrupt instance of file 408. In this example, backup mechanism 212 may also automatically update file 2 included in backup image 122 based at least in part on change to computing state 404.

In one example, remediation module 110 may identify a duplicate instance of backup image 122 that is corrupt. For example, backup mechanism 212 may have generated corrupt duplicate instance of backup image 400 in FIG. 4 from backup image 122 after file 406 included in backup image 122 became corrupt. In this example, corrupt duplicate instance of backup image 400 may include the same corrupt file 406 as backup image 122 since corrupt duplicate instance of backup image 400 inherited corrupt file 406 from backup image 122.

In one example, remediation module 110 may also direct backup mechanism 212 to incorporate update to backup image 402 into corrupt duplicate instance of backup image 400. For example, backup mechanism 212 may automatically replace corrupt file 406 included in corrupt duplicate instance of backup image 400 with non-corrupt instance of file 408. In this example, backup mechanism 212 may also automatically update file 2 included in corrupt duplicate instance of backup image 400 based at least in part on change to computing state 404.

As explained above in connection with method 300 in FIG. 3, a user may configure his or her laptop computer to back up various files to a remote backup service. In one example, the user's laptop computer may generate a backup image that represents all of the files located on the laptop computer at a specific point in time. Upon generating the backup image, the user's laptop computer may upload the backup image to the remote backup service.

Unfortunately, the remote backup service may be susceptible to an occasional system failure capable of causing data corruption within at least one file included in the backup image. In an effort to eliminate (or at least decrease) the risk of losing data altogether due to such a system failure, the remote backup service may periodically perform a data-corruption analysis on the backup image to determine whether the backup image has become corrupt.

In the event that the remote backup service determines that the backup image has become corrupt, the remote backup service may perform at least one remedial action to initiate remedying the backup image. In one example, the remote backup service may provide an alert for display on an administrative device associated with an administrator responsible for maintaining the backup image via the remote backup service. In another example, the remote backup service may automatically replace the corrupt backup image with a non-corrupt duplicate instance of the backup image.

In an additional example, the remote backup service may automatically initiate a backup operation on the user's laptop computer to capture a replacement backup image that represents all of the files located on the laptop computer at the present time. In a further example, the remote backup service may automatically replace only the corrupt file(s) included in the backup image with the non-corrupt instance(s) located on the user's laptop.

Accordingly, by periodically performing a data-corruption analysis on a backup image, the remote backup service may determine that at least a portion of the backup image is corrupt and then automatically initiate remedying the corrupt file(s) included in the backup image in response to this determination. By remedying the corrupt file(s) included in the backup image in response to this determination, the remote backup service may ensure that a remedied instance of the backup image is available in the event that the user attempts to restore his or her laptop to the earlier computing state represented by the backup image.

Figure 6:
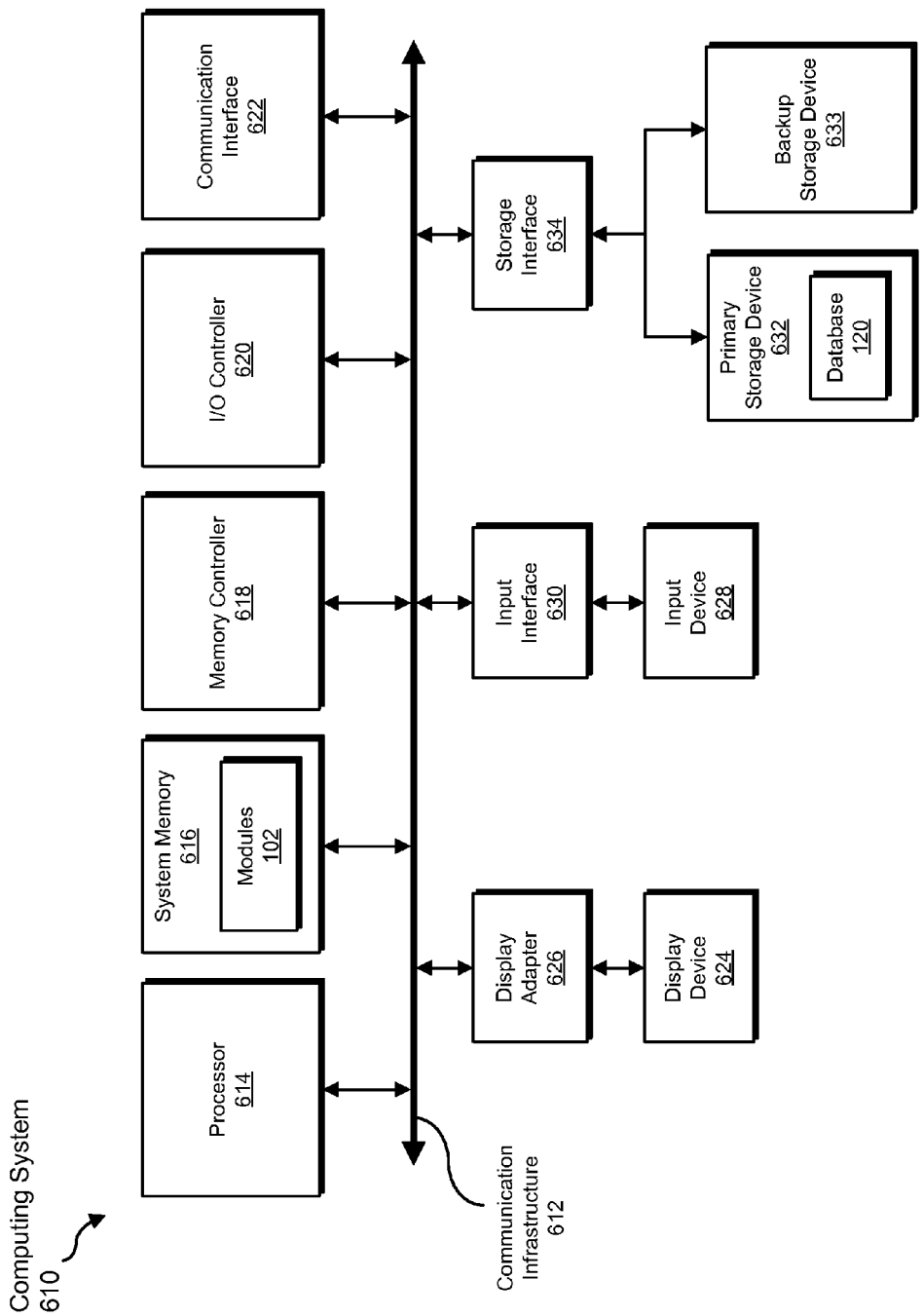
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, performing, determining, providing, automatically replacing, using, initiating, incorporating, directing, reconfiguring, and detecting steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
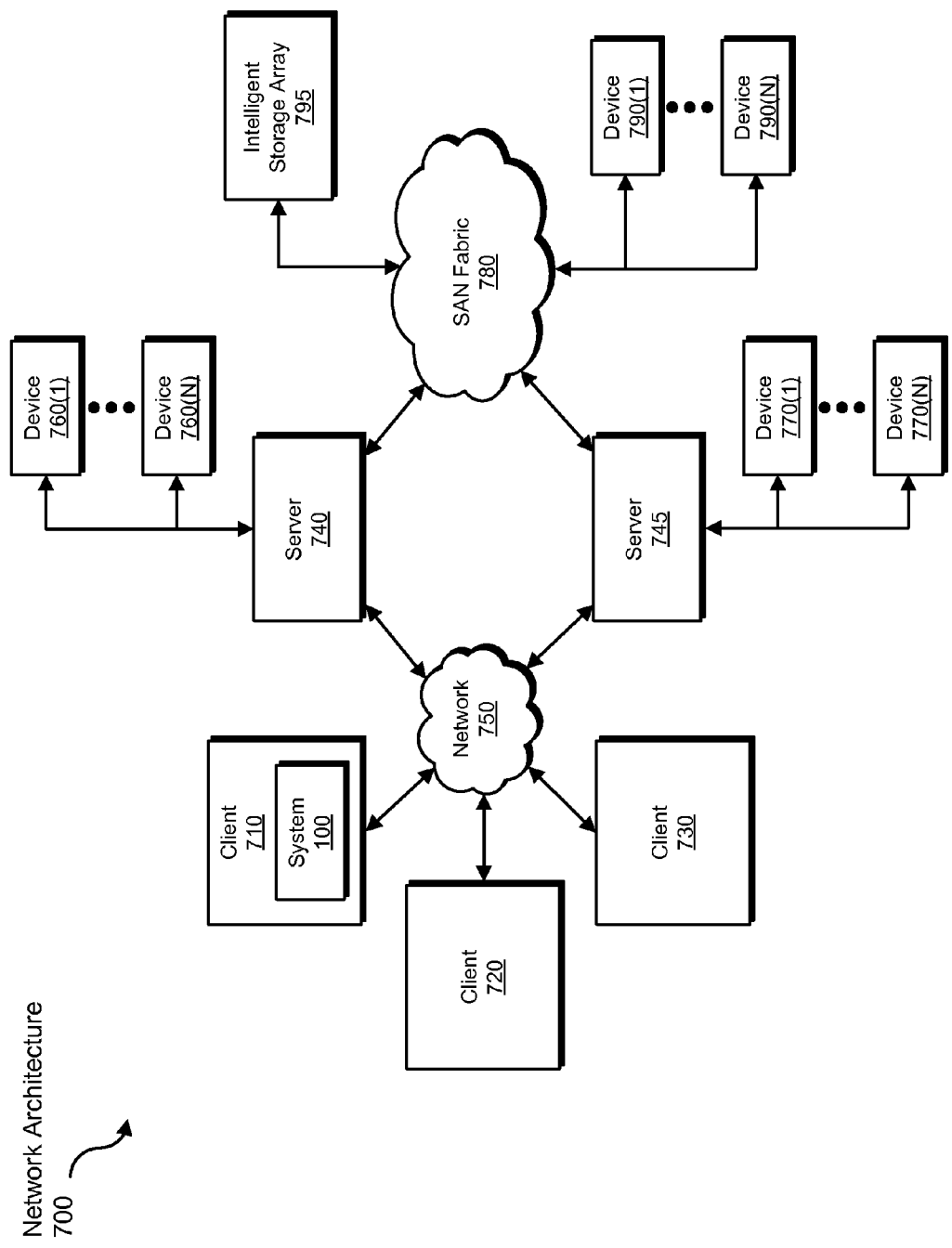
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, performing, determining, providing, automatically replacing, using, initiating, incorporating, directing, reconfiguring, and detecting steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for remedying corrupt backup images of host devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, output a result of the transformation to facilitate remedying a backup image, use the result of the transformation to ensure that a remedied backup image is available, and store the result of the transformation to facilitate restoring the data to a computing device based at least in part on the backup image. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for remedying corrupt backup images of host devices, at least a portion of the method being performed by a computing device comprising at least one processor, the method comprising:
   identifying a backup image that represents a computing state of a host device at a specific point in time;
   performing a data-corruption analysis on the backup image that represents the computing state of the host device to determine whether the backup image is corrupt;
   determining, based at least in part on the data-corruption analysis, that at least a portion of the backup image is corrupt by:
      identifying a plurality of files included in the backup image during the data-corruption analysis;
      determining, based at least in part on the data-corruption analysis, that a file included in the plurality of files is corrupt;
   in response to determining that the portion of the backup image is corrupt, performing at least one remedial action to initiate remedying the corrupt portion of the backup image by:
      initiating a backup operation on the host device to capture a non-corrupt instance of the file from the host device;
      incorporating the non-corrupt instance of the file into the backup image by automatically replacing the corrupt file included within the plurality of files with the non-corrupt instance of the file.

2. The method of claim 1, wherein performing the remedial action to initiate remedying the corrupt portion of the backup image comprises:
   identifying an administrative device associated with an administrator responsible for maintaining the backup image;
   providing the administrative device with an alert configured to notify the administrator of the corrupt portion of the backup image.

3. The method of claim 1, wherein performing the remedial action to initiate remedying the corrupt portion of the backup image comprises:
   identifying a duplicate instance of the backup image that is not corrupt;
   automatically replacing the backup image with the non-corrupt duplicate instance of the backup image such that the non-corrupt duplicate instance of the backup image is used to restore the host device to the computing state during a restore operation.

4. The method of claim 3, wherein identifying the duplicate instance of the backup image comprises using a relational-mapping mechanism to identify the non-corrupt duplicate instance of the backup image based at least in part on the backup image.

5. The method of claim 1, wherein performing the remedial action to initiate remedying the corrupt portion of the backup image comprises:
   initiating a backup operation on the host device to capture a replacement backup image that represents the computing state of the host device at a current point in time;
   automatically replacing the backup image with the replacement backup image such that the replacement backup image is used to restore the host device to the computing state during a restore operation.

6. The method of claim 1, wherein initiating the backup operation on the host device comprises initiating the backup operation to capture a non-corrupt instance of the file at a current point in time.

7. The method of claim 1, wherein initiating the backup operation on the host device comprises:
   identifying a backup mechanism configured to periodically update the backup image based at least in part on at least one change to the computing state of the host device;
   directing the backup mechanism to capture a non-corrupt instance of the file during a future update to the backup image such that the backup mechanism captures the non-corrupt instance of the file and the change to the computing state of the host device without capturing an additional instance of each of the plurality of files included in the backup image during the future update.

8. The method of claim 7, wherein incorporating the non-corrupt instance of the file into the backup image comprises:
   after the backup mechanism has captured the non-corrupt instance of the file, incorporating the non-corrupt instance of the file into the backup image by automatically replacing the corrupt file included within the plurality of files with the non-corrupt instance of the file.

9. The method of claim 1, wherein incorporating the non-corrupt instance of the file into the backup image comprises reconfiguring the backup image to reference the non-corrupt instance of the file instead of the corrupt file.

10. The method of claim 1, wherein performing the data-corruption analysis on the backup image that represents the computing state of the host device comprises performing the data-corruption analysis on the backup image on a periodic basis.

11. The method of claim 1, wherein performing the data-corruption analysis on the backup image that represents the computing state of the host device comprises:
   detecting an event that suggests that at least a portion of the backup image is corrupt;
   initiating the data-corruption analysis in response to detecting the event that suggests that the portion of the backup image is corrupt.

12. A system for remedying corrupt backup images of host devices, the system comprising:
   an identification module programmed to identify a backup image that represents a computing state of a host device at a specific point in time;
   an analysis module programmed to perform a data-corruption analysis on the backup image that represents the computing state of the host device to determine whether the backup image is corrupt;
   a determination module programmed to determine that at least a portion of the backup image is corrupt based at least in part on the data-corruption analysis by:
      identifying a plurality of files included in the backup image during the data-corruption analysis;
      determining, based at least in part on the data-corruption analysis, that a file included in the plurality of files is corrupt;
   a remediation module programmed to perform at least one remedial action to initiate remedying the corrupt portion of the backup image in response to the determination that the portion of the backup image is corrupt by:
  initiating a backup operation on the host device to capture a non-corrupt instance of the file from the host device;
  incorporating the non-corrupt instance of the file into the backup image by automatically replacing the corrupt file included within the plurality of files with the non-corrupt instance of the file;
at least one processor configured to execute the identification module, the analysis module, the determination module, and the remediation module.

13. The system of claim 12, wherein the remediation module is programmed to:
  identify an administrative device associated with an administrator responsible for maintaining the backup image;
  provide the administrative device with an alert configured to notify the administrator of the corrupt portion of the backup image.

14. The system of claim 12, wherein the remediation module is programmed to:
  identify a duplicate instance of the backup image that is not corrupt;
  automatically replace the backup image with the non-corrupt duplicate instance of the backup image such that the non-corrupt duplicate instance of the backup image is used to restore the host device to the computing state during a restore operation.

15. The system of claim 14, wherein the remediation module is programmed to use a relational-mapping mechanism to identify the non-corrupt duplicate instance of the backup image based at least in part on the backup image.

16. The system of claim 12, wherein the remediation module is programmed to:
  initiate a backup operation on the host device to capture a replacement backup image that represents the computing state of the host device at a current point in time;
  automatically replace the backup image with the replacement backup image such that the replacement backup image is used to restore the host device to the computing state during a restore operation.

17. The system of claim 12, wherein initiating the backup operation on the host device comprises initiating the backup operation to capture a non-corrupt instance of the file at a current point in time.

18. The system of claim 12, wherein initiating the backup operation on the host device comprises:
  identifying a backup mechanism configured to periodically update the backup image based at least in part on at least one change to the computing state of the host device;
  directing the backup mechanism to capture a non-corrupt instance of the file during a future update to the backup image such that the backup mechanism captures the non-corrupt instance of the file and the change to the computing state of the host device without capturing an additional instance of each of the plurality of files included in the backup image during the future update.

19. The system of claim 18, wherein incorporating the non-corrupt instance of the file into the backup image comprises:
  after the backup mechanism has captured the non-corrupt instance of the file, incorporating the non-corrupt instance of the file into the backup image by automatically replacing the corrupt file included within the plurality of files with the non-corrupt instance of the file.

20. A non-transitory computer-readable-storage medium comprising one or more computer-executable instructions that, when executed by at least one processor of a computing device, cause the computing device to:
  identify a backup image that represents a computing state of a host device at a specific point in time;
  perform a data-corruption analysis on the backup image that represents the computing state of the host device to determine whether the backup image is corrupt by:
    identifying a plurality of files included in the backup image during the data-corruption analysis;
    determining, based at least in part on the data-corruption analysis, that a file included in the plurality of files is corrupt;
  determine that at least a portion of the backup image is corrupt based at least in part on the data-corruption analysis by:
    initiating a backup operation on the host device to capture a non-corrupt instance of the file from the host device;
    incorporating the non-corrupt instance of the file into the backup image by automatically replacing the corrupt file included within the plurality of files with the non-corrupt instance of the file;
  perform at least one remedial action to initiate remedying the corrupt portion of the backup image in response to the determination that the portion of the backup image is corrupt.

* * * * *